United States Patent [19]

Yanai et al.

[11] Patent Number: 5,082,714

[45] Date of Patent: Jan. 21, 1992

[54] MAGNETIC RECORDING MEDIA

[75] Inventors: Akio Yanai; Yasuo Nishikawa, both of Kanagawa, Japan

[73] Assignee: Fuji Photo Film Co., Ltd., Kanagawa, Japan

[21] Appl. No.: 255,005

[22] Filed: Oct. 7, 1988

[30] Foreign Application Priority Data

Oct. 7, 1987 [JP] Japan .................. 62-251451

[51] Int. Cl.⁵ .................................................. B32B 3/10
[52] U.S. Cl. ..................................... 428/141; 428/336; 428/421; 428/694; 428/695; 428/900
[58] Field of Search ............... 428/141, 694, 695, 900, 428/300

[56] References Cited

U.S. PATENT DOCUMENTS

| | | | |
|---|---|---|---|
| 4,268,556 | 5/1981 | Pedrotty | 428/900 |
| 4,526,833 | 7/1985 | Burguette et al. | 428/695 |
| 4,526,836 | 7/1985 | Mukai et al. | 428/695 |
| 4,536,444 | 8/1985 | Sumiya et al. | 428/695 |
| 4,578,729 | 3/1986 | Suzuki et al. | 428/900 |
| 4,659,633 | 4/1987 | Yamaguchi et al. | 428/694 |
| 4,729,924 | 3/1988 | Skorjanec et al. | 428/695 |
| 4,803,125 | 2/1989 | Takeuchi et al. | 428/694 |
| 4,842,939 | 6/1989 | Scarati et al. | 428/695 |
| 4,889,767 | 12/1989 | Yokoyama et al. | 428/695 |

FOREIGN PATENT DOCUMENTS 113130  5/1986  Japan .

Primary Examiner—Merrell C. Cashion, Jr.
Assistant Examiner—Robert J. Follett
Attorney, Agent, or Firm—Sughrue, Mion, Zinn, Macpeak & Seas

[57] ABSTRACT

The running properties and durability under a wide range of temperature and humidity conditions are improved by the presence of terminally modified polyhexafluoropropylene on a thin ferromagnetic metal film.

4 Claims, No Drawings

MAGNETIC RECORDING MEDIA

FIELD OF THE INVENTION

This invention concerns thin metal film type magnetic recording media in which the magnetic layer is in the form of a thin ferromagnetic metal film which has been formed by means of a vapor deposition method, such as vacuum evaporation, sputtering, etc., on a non-magnetic support.

BACKGROUND OF THE INVENTION

Coated type magnetic recording media obtained by coating a dispersion of magnetic powders such as $\gamma$-$Fe_2O_3$, Co-doped $\gamma$-$Fe_2O_3$, $\gamma$-$Fe_3O_4$, $CrO_2$, Berthollide compounds of Co-doped $\gamma$-$Fe_2O_3$ and $Fe_3O_4$, etc., or ferromagnetic metal alloy powders etc., in an organic binder such as vinyl chloride-vinyl acetate copolymer, styrene-butadiene copolymer, epoxy resin, polyurethane resin, etc., on a non-magnetic support and drying the coated layer have been widely used in the past.

However, with the recent increasing demand for higher recording densities, various attempts have been made to provide thin metal film type magnetic recording media where a thin film of ferromagnetic metal formed by a vapor deposition method such as vacuum vapor deposition, sputtering or ion plating, by a plating method such as electro-plating or electroless plating, etc., is used for the magnetic recording layer in which no binder is used.

For thin metal film media of this type there is no need to mix an organic binder in the magnetic layer and thus the packing density of the magnetic material is increased and the magnetic layer can be made considerably thinner (for example 0.05 to 0.3 $\mu$m) than in the case of a coated type medium. Hence it is to be expected that media of this type will be of importance for the realization of more compact, high density recording media.

Of the methods used for forming thin metal film magnetic layers on a support, the vapor deposition method is suitable for the manufacture of media which have a large surface area, such as tapes, since the build-up speed of the film can be high with this method.

The oblique vapor deposition method described in U.S. Pat. Nos. 3,342,632 and 3,342,633 etc. is known as a method for the manufacture of magnetic films which have coercive force and squareness ratio.

Moreover, supports which have a very smooth surface are used for such thin metal film type media and excellent electromagnetic conversion characteristics are ensured. However, in this case, the contact area between the magnetic layer and the magnetic head and parts of the running system is increased and the coefficient of friction is increased, and problems arise with running durability.

The provision of very small protrusions on the surface of the magnetic layer in order to reduce the contact area, as indicated in JP-A-59-42638 for example, has been suggested. (The term "JP-A" herein used means an unexamined published Japanese patent application.) However, practical running properties and durability are not obtained by simply using these methods.

Attempts have also been made to improve running properties and durability by means of lubricating layers consisting of organic compounds which are provided on the surface of the magnetic layer and very small protrusions (JP-A-60-93636 and JP-A-61-11921).

Also, sulfur based extreme pressure agents have been suggested as lubricants which have a high adhesive force for the magnetic layer (JP-A-61-178718).

However, there are problems with running durability at low humidity even when a protective lubrication layer consisting of lubricants of the type mentioned above has been provided and, in practice, "still" durability is inadequate and head contamination and head blockage occur on repeated running.

The use of fluorine base polyethers which have a —$C_nF_{2n}O$— unit as a skeleton and polar terminal groups as lubricants has also been suggested (U.S. Pat. No. 4,268,556). However, satisfactory "still" durability and high repeat running passes are not obtained even when lubricants of this type are used on thin ferromagnetic film type magnetic recording media, and head contamination continues to occur.

SUMMARY OF THE INVENTION

This invention provides thin metal film type magnetic recording media which are improved with respect to the points indicated above and which have excellent running properties and durability.

As a result of research concerning a variety of organic compounds, the inventors discovered that terminally modified polyoxyhexafluoropropylenes where the main chain has a linear structure are effective for such purpose.

The present invention thus provides magnetic recording media whose distinguishing feature is that, in magnetic recording media in which a magnetic layer consisting of a thin ferromagnetic metal film is formed on a non-magnetic support, and a protective layer which contains at least a terminally modified polyoxyfluoropropylene where the main chain has a linear structure is provided on the surface of the said magnetic layer.

DESCRIPTION OF PREFERRED EMBODIMENTS

The terminally modified polyoxyhexafluoropropylenes which can be used in the invention are preferably represented by the following formula

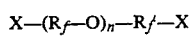

wherein X represents a polar terminal group, $R_f$ represents perfluoropropylene group, $R_f'$ represents a perfluoroalkylene group, and n is an integer, and the molecular weight thereof is preferably from 500 to 4,000. The terminal groups may be —COOH groups, —OH groups, —SH groups, —COOCH$_3$ groups or —CONHR groups (where R is a hydrocarbon group having 1 to 22 carbon atoms, preferably an alkyl group having 1 to 4 carbon atoms).

Preferred examples of the terminally modified polyoxyhexafluoropropylenes are shown below.

I. $HOCH_2—(CF_2CF_2CF_2—O)_n—CF_2CF_2—CH_2OH$

II. $HOOC—(CF_2CF_2CF_2—O)_n—CF_2CF_2—COOH$

III. $H_3COOC—(CF_2CF_2CF_2—O)_n—CF_2CF_2—COOH_3$

IV. $HS—CH_2—(CF_2CF_2CF_2—O)_n—CF_2CF_2—CH_2SH$

V. $H_2N—CH_2—(CF_2CF_2CF_2—O)_n—CF_2CF_2—CH_2NH_2$

VI. $RNH—CH_2—(CF_2CF_2CF_2—O)_n—CF_2CF_2—CH_2—NHR$

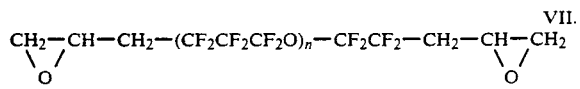

VII.

VIII. OCN—(CF$_2$CF$_2$CF$_2$O)$_n$—CF$_2$CF$_2$—NCO

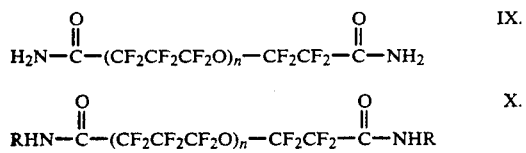

(Where R and n are the same as defined above.)

Of these compounds, II and III have an especially pronounced effect.

The lubricating agents of this invention are generally dissolved in a solvent such as hexane, methyl ethyl ketone, toluene, benzene, etc., either alone or together with other substances, and coated onto the surface of the magnetic layer.

The coated amount of the terminally modified polyoxyhexafluoropropylene is from 1 to 50 mg/m$^2$, and preferably from 5 to 20 mg/m$^2$. If the amount coated is less than 1 mg/m$^2$, the effect of improving durability is inadequate. Conversely, if more than 50 mg/m$^2$ is used, a gap between the magnetic recording medium and the recording/play back head becomes large, resulting in large spacing loss, and this is undesirable.

Conventional lubricants can be admixed with one or more of the compounds indicated above in the protective lubricating layers which are provided on the surface of the thin magnetic film in this invention. Such a conventional lubricant can be added in an amount of from 10 to 1,000 wt % based on the amount of the compound of the present invention. Examples of lubricants which can be admixed in this way include fatty acids, metal soaps, fatty acid amides, fatty acid esters, higher aliphatic alcohols, monoalkyl phosphates, dialkyl phosphates, trialkyl phosphates, paraffins, silicone oils, animal and vegetable oils, mineral oils, higher aliphatic amines, inorganic powders such as graphite, silica, molybdenum disulfide, tungsten disulfide, etc., resin powders such as polyethylene, polypropylene, poly(vinyl chloride), ethylene-vinyl chloride copolymers, polytetrafluoroethylene, etc., α-olefin polymers, unsaturated aliphatic hydrocarbons which are liquid at normal temperature, fluorocarbons, etc.

The protective and lubricating layer may consist of a single layer or a plurality of layers.

The material used to form the thin ferromagnetic film may be a ferromagnetic metal such as iron, cobalt and nickel, or a ferromagnetic alloy such as an Fe-Co, Fe—Ni, Co—Ni, Fe—Rh, Co—P, Co—B, Co—Y, Co—La, Co—Ce, Co—Cr, Co—Pt, Co—Sm, Co—Mn, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W and Co-Ni-Re which is formed by electroplating, electroless plating, gas phase plating, sputtering, vapor deposition, ion plating, etc., and when used as a magnetic recording medium the film thickness is within the range from 0.02 to 2 μm, and preferably within the range from 0.05 to 0.4 μm.

The thin ferromagnetic metal films may also contain O, N, Cr, Ga, As, Sr, Zr, Nb, Mo, Rh, Pd, Sn, Sb, Te, Pm, Re, Os, Ir, Au, Hg, Pb, Bi, etc. Especially good electromagnetic conversion characteristics and durability are obtained when oxygen is included in the thin ferromagnetic metal film.

The surface form of the magnetic layer is not particularly limited, but superior running properties and durability are obtained when the surface has protrusions of a height from 10 to 100 Å and a size (diameter) from 50 to 1,000 nm and a density (number/mm$^2$) of from $10^4$ to $10^8$.

The thickness of the support is preferably from 2.5 to 100 μm. Furthermore, an undercoating layer may be provided on the support to improve the adhesion of the thin ferromagnetic layer and to improve the magnetic characteristics, as described in U.S. Pat. No. 4,504,542.

Plastic bases made of polyethylene terephthalate, polyimide, polyamide, poly(vinyl chloride), cellulose triacetate, polycarbonate, polyethylene naphthalate, poly(phenylene sulfide), etc., or aluminum, titanium or stainless steel, etc., can be used as the support or base material in this invention.

In the case of a tape-like medium, the application of a back coat consisting of a dispersion of pigment in a resin is especially desirable to obtain good running properties and durability, as described in U.S. Pat. No. 4,670,333.

The magnetic recording medium may take the form of a tape, sheet, card, disk, etc., but it is preferably in the form of a tape or a disk.

The invention is described in practical terms below by means of Example, but it is not limited by the example.

EXAMPLE

A cobalt-nickel alloy magnetic film (Ni: 25 atomic %) was formed to a thickness of 200 nm by oblique vapor deposition on a polyethylene terephthalate film of thickness 12 μm. The oblique angle of incidence was 38° and the vapor deposition was carried out under a vacuum of $1.5 \times 10^{-4}$ torr with introducing oxygen at a flow rate of 0.40 liter/min into the vacuum chamber. Each of the lubricants shown in Table 1 was coated in an amount of 15 mg/m$^2$ onto the surface of the magnetic film using a solvent (hexane for Samples Nos. 1 to 3 and Freon 113 for Sample Nos. 4 to 12) by rod coating at a coating speed of 70 m/min, and a solution consisting of carbon black and a binding agent was coated onto the back of the film to form a backing layer. The still durability and repetitive running durability at 23° C., 10% RH of the samples so obtained were investigated. The results obtained are shown in Table 2.

The still durability was measured by subjecting the samples in still mode using a 8-mm VTR ("FUJIX-8M6" manufactured by Fuji Photo Film Co., Ltd.).

The repetitive running durability was assessed in terms of the number of times the tape ran before the output fell to below 3 dB due to head blockage and the state of contamination of the head was measured after 100 passes, on repeatedly playing back a 50 m length of tape 100 times using an 8 mm type VTR (FUJIX-8M6).

TABLE 1

| No. | |
|---|---|
| L1 | Stearic acid |
| L2 | Stearyl alcohol |
| L3 | Butyl stearate |
| L4 | F—(CH$_2$CF$_2$CF$_2$—O)$_n$—CF$_2$CF$_2$—F<br>Average molecular weight 2500 ("Demunasu S-20", made by Daikin Industries) |
| L5 | HO—CH$_2$—(CF$_2$CF$_2$CF$_2$—O)$_n$—CF$_2$CF$_2$CH$_2$—OH |
| L6 | HS—CH$_2$—(CF$_2$CF$_2$CF$_2$—O)$_n$—CF$_2$CF$_2$CH$_2$—SH |

TABLE 1-continued

| No. | |
|---|---|
| L7 | $HOOC-(CF_2CF_2CF_2-O)_n-CF_2CF_2COOH$ |
| L8 | $CH_3-CO-(CF_2CF_2CF_2-O)_n-CF_2CF_2COOCH$ |
| L9 | $CH_3-NH-CO-(CF_2CF_2CF_2-O)_{\overline{n}}-CF_2CF_2CONHCH_3$ |
| L10 | $HOOC-(CF_2\overset{\underset{\displaystyle CF_3}{\mid}}{CF}-O)COOH$ |
| L11 | $HOCH_2-(CF_2\overset{\underset{\displaystyle CF_3}{\mid}}{CF}-O)_nCOOH$ |
| L12 | $HOOC-(CF_2CF_2CF_2-O)_n-(CF_2O)_{n'}-COOH$ |

TABLE 2

| Sample No. | Overcoat No. | Still Durability (23° C., 10% RH) | No. of Repeat Running Passes (23° C., 10% RH) | Heat Contamination (23° C., 10% RH) |
|---|---|---|---|---|
| 1 | L1 | 6 minutes | 35 Passes | x |
| 2 | L2 | 15 | 18 | xx |
| 3 | L3 | 4 | 45 | x |
| 4 | L4 | >30 | 10 | ○ |
| 5 | L5 | " | 100 | ○ |
| 6 | L7 | " | " | ○ |
| 7 | L7 | " | " | ○ |
| 8 | L8 | " | " | ○ |
| 9 | L9 | " | " | ○ |
| 10 | L10 | 20 | 75 | △ |
| 11 | L11 | 15 | 68 | △ |
| 12 | L12 | 18 | 82 | △ |

Sample Nos. 1 to 4 and 10 to 12 are comparative examples, Sample Nos. 5 to 9 are examples of the invention.
○: No contamination,
△: Slight contamination,
x: Contamination,
xx: Marked contamination.
Assessed by examination with a 100× microscope.

While the invention has been described in detail and with reference to specific embodiments thereof, it will be apparent to one skilled in the art that various changes and modifications can be made therein without departing from the spirit and scope thereof.

What is claimed is:

1. Magnetic recording media comprising a nonmagnetic support having thereon in sequence a ferromagnetic metal film magnetic layer having a thickness of from 0.02 to 2 μm and a protective layer comprising from 1 to 50 mg/m² of a polyoxyhexafluoropropylene comprising a chain of $-(CF_2CF_2CF_2-O)-$ units and being terminally modified with a polar terminal group and having a main chain of linear structure; and wherein the terminal modifying group of the terminally modified polyoxyhexafluoropropylene is selected from the group consisting of —COOH, —OH, —SH, —COOCH$_3$ and —CONHR, where R is a hydrocarbon group having 1 to 22 carbon atoms.

2. Magnetic recording media as claimed in claim 1, wherein the terminal modified polyoxyhexafluoropropylene is coated in an amount of from 5 to 20 mg/m².

3. Magnetic recording media as claimed in claim 1, wherein the ferromagnetic metal film magnetic layer has a thickness of from 0.05 to 0.4 μm.

4. Magnetic recording media as claimed in claim 1, wherein the surface of the ferromagnetic metal film magnetic layer has protrusions of a height from 10 to 1,000 Å and a size in diameter from 50 to 1,000 nm and a density of from $10^4$ and $10^8$/mm².

* * * * *